Patented June 24, 1941

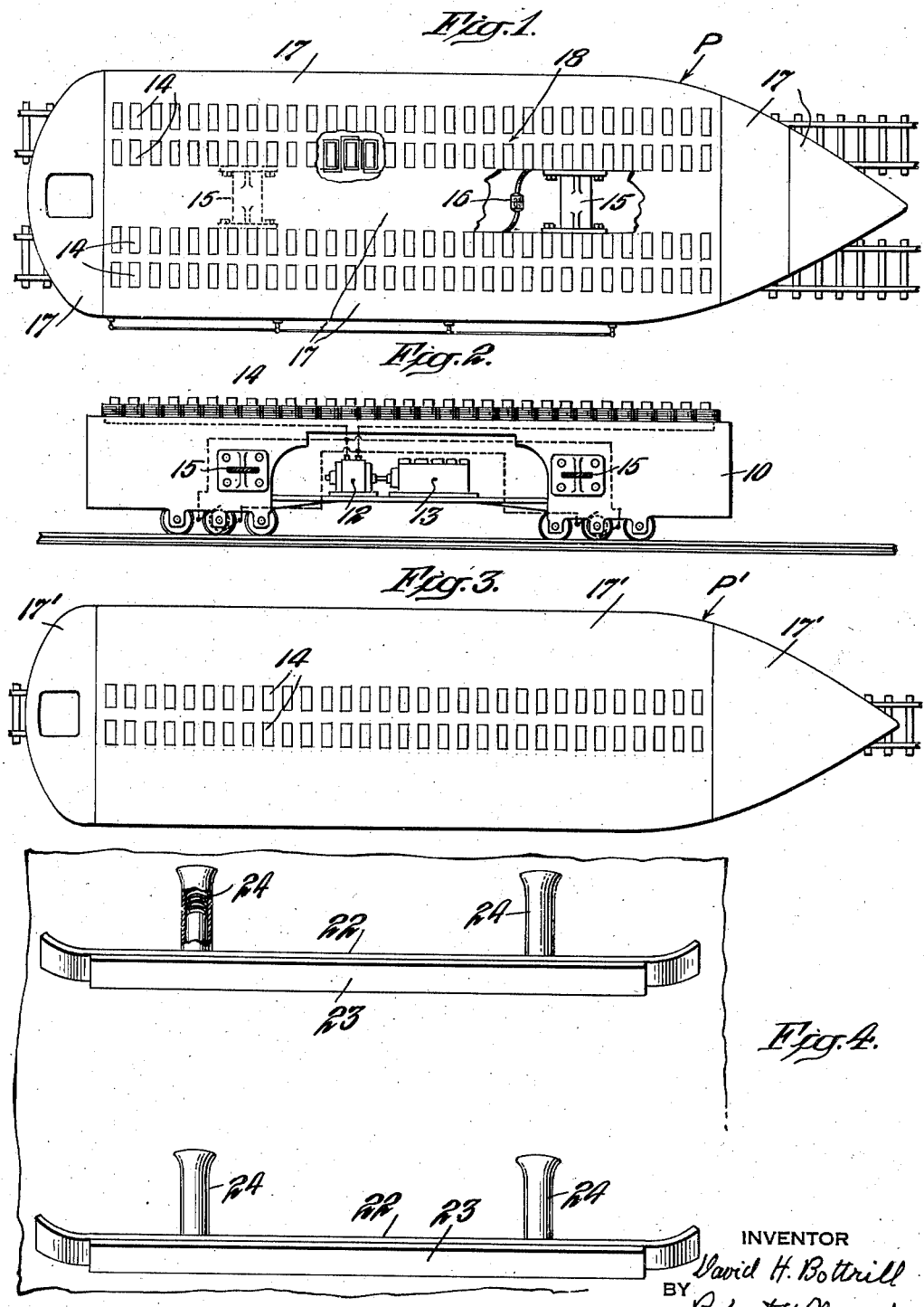
June 24, 1941. D. H. BOTTRILL 2,246,716
ART OF LANDING AIRPLANES
Filed May 5, 1939 2 Sheets-Sheet 1

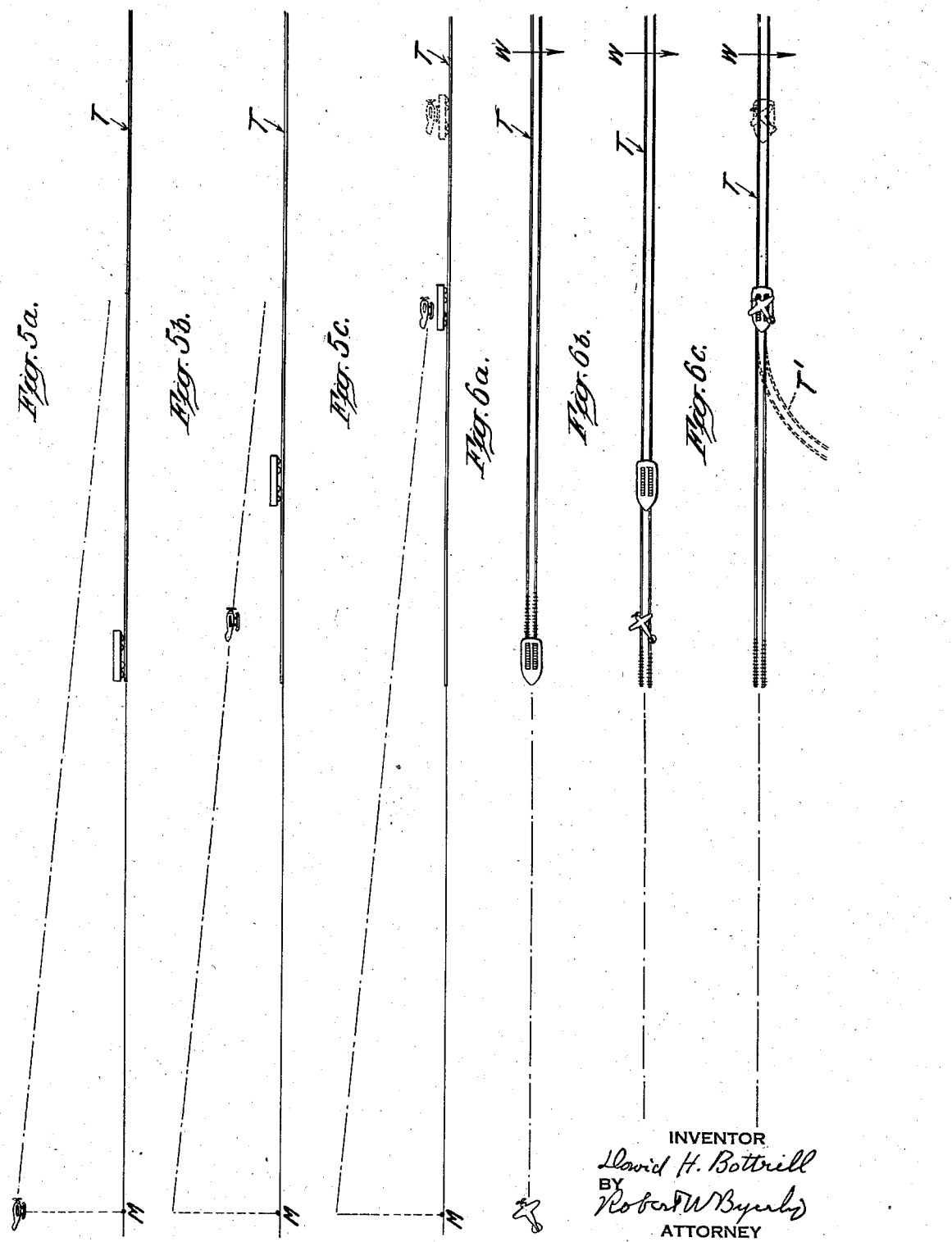

2,246,716

UNITED STATES PATENT OFFICE 2,246,716

ART OF LANDING AIRPLANES

David H. Bottrill, Montreal, Quebec, Canada, assignor to Canadian Car & Foundry Company Limited, Montreal, Quebec, Canada, a corporation of Quebec, Canada Application May 5, 1939, Serial No. 271,989

7 Claims. (Cl. 244—110)

This invention relates to an improvement in the art of landing airplanes and includes a method of landing airplanes and apparatus for use in the method.

The present method of landing airplanes places serious limitations on the use of airplanes. In order that landings may be made up-wind, it is necessary to provide landing fields of large area so that smooth and unobstructed runways may be provided in all directions. This limits the commercial usefulness of airplanes owing to the difficulty of securing large open tracts of land near large cities. It also limits the military use of airplanes since the air fields provide large and conspicuous marks for bombing by the enemy.

The present method of landing seriously limits the design of airplanes. The necessity for carrying on the airplane landing gear of adequate strength limits the amount of pay load which might otherwise be carried. A still more serious limitation is in connection with speed. The maximum speed under present principles of design is about 4 times the minimum flying speed, the latter being the lowest speed at which the airplane can be controlled in the air, that is to say, a speed just above stalling speed. With the present methods of landing, considerations of safety limit minimum flying speeds to about 70 miles an hour, so that maximum speeds are limited to approximately 280 miles an hour.

These limitations on the usefulness and on the design of airplanes are eliminated by my invention which does away with the necessity of landing fields of large area and provides for safe landings at speeds of 100 miles an hour or more, so that without change in the present principles of design it is possible to increase the maximum speeds of airplanes to 400 miles an hour and above.

In accordance with my invention, the ordinary landing field is replaced by a mobile landing platform which may be rapidly accelerated and propelled at high speed along a fixed straight line whose direction remains the same regardless of the direction of the wind. When an airplane flying at a moderate elevation passes over a fixed point at a predetermined distance behind the landing platform, the platform is accelerated from a standstill along its fixed line of movement until it attains its maximum speed which is held constant. The airplane is pointed in such direction with respect to the wind that its motion over the ground is along the line of movement of the platform at a speed somewhat greater than the maximum speed of the platform. The speed and elevation of the airplane are gradually reduced so that when the airplane overtakes the platform, it is only a short distance above the platform and is moving over the ground in the same direction as the platform and at the same speed. While there is thus no relative horizontal movement between the airplane and the platform, the airplane is landed on the platform and secured to it. The platform carrying the airplane is then decelerated to a standstill. The minimum flying speed of the airplane used in this method may be as great as the maximum speed of the platform which may easily be made one hundred miles an hour or above if the platform is supported and moved on ordinary railroad tracks.

In order that the nature of my invention may fully be understood, I will describe in detail specific methods and illustrative apparatus embodying my invention. In the description, I shall refer to the accompanying drawings, in which:

Fig. 1 is a top view of a landing platform including two railway cars side-by-side, with parts broken away to show the connections between the cars;

Fig. 2 is a side view of one of the railway cars forming part of the platform shown in Fig. 1;

Fig. 3 is a top view of a landing platform including only one railway car;

Fig. 4 is a perspective view of the underpart of an airplane showing the landing skids; and Figs. 5a, 5b, 5c and 6a, 6b, 6c are diagrams showing a method of landing on the mobile platform of Fig. 1 or Fig. 3, Figs. 5a, 5b, 5c being elevations and Figs. 6a, 6b, 6c plan views.

The mobile landing platform P shown in Fig. 1 includes two automotive railway cars 10. Each car 10 is of standard railroad gauge and is provided with a driving mechansim capable of giving the car a high speed and a rapid acceleration. The driving mechanism includes electric motors 11 on the wheel axles and an electric generator 12 driven by a Diesel or other type of internal combustion engine 13, as in standard automotive railroad cars now used for passenger traffic. For rapid acceleration, it is desirable that the engine of each car should be of 1500 horse power. At the top of the car is an electromagnetic grid 14 which may be energized by the current from the generator. Detachable cross beams 15 are provided for securing two of the cars together side-by-side on a double-track railroad, and a detachable connection 16 is provided between the electric circuits of two cars so attached in order that they may be controlled as a unit. Detachable members 17 are secured to the two cars to provide fairing to reduce the air resistance to the movement of the cars. The detachable fairing members 17 serve also to provide a wide flat landing surface 18 on a level with the electromagnetic grids 14 of the two cars.

The landing platform may conveniently be transported from place to place along an ordinary railroad track. For this purpose the two cars may be coupled end-to-end in the ordinary manner and the detachable fairing 17 may be carried in an ordinary flat car 19 drawn by the two automotive cars 10. When the equipment arrives at the place at which the landing is to be made, the cars are attached side-by-side and the fairing is assembled as shown in Fig. 1.

In addition, it may be desirable to provide detachable fairing pieces 17' which can be secured to a single car to provide a mobile landing platform P' (Fig. 3) for planes lighter than those which may be landed on the platform P which includes two cars secured side-by-side. The platform P' is suitable for landing airplanes up to 30,000 pounds gross weight. For heavier planes, the double-car platform P should be used.

The landing platform is provided with a two-way radio station for communication with airplanes and preferably also with a short-wave beam transmitting apparatus for use in blind landings.

The airplanes used with the mobile landing platform are provided with landing skids 22 the bottoms of which carry plates or thin bars of magnetizable metal (Fig. 4). Most desirably, there are shock absorbers, such as a coiled spring 24, between the skids and the body of the airplane. The usual landing gear may be omitted.

The use of the mobile landing field which has been described requires a straight level railroad track whose length depends upon the minimum flying speed of the plane. For a minimum flying speed of 100 miles an hour, a straight track length of 8,000 feet or even less is sufficient. When the two-car landing field which has been described is used, a double track is, of course, necessary. There should be no high obstructions close to the track.

Figs. 5a, 5b, 5c and 6a, 6b, 6c illustrate diagrammatically a specific method of landing using the equipment which has been described in which the landing platform is powered for an acceleration of 5 feet per second per second and a sustained uniform speed of 100 miles an hour. The airplane is provided with skids of the type which have been described and has a minimum flying speed of 100 miles an hour. The straight track T is 8,000 feet in length. Points on a line with the track and 3,000 feet from each of its ends are provided with markers M easily visible from the air. Only one of the markers and only a part of the track is shown in the diagrams.

In order to illustrate the most difficult condition, it will be assumed that there is a wind of 50 miles an hour blowing directly across the track, as indicated by the arrow W. Under this condition, the method of landing is as follows: The airplane is flown over one of the markers M and, when directly over the marker, sends a radio message to the landing platform, which is then stationary at the end of the track nearest to this marker, and the platform is immediately set in motion. The airplane should be brought over the marker at an altitude of about 600 feet (Fig. 5a). It is immediately pointed in such direction and its air speed is so regulated that its movement along the ground is in line with the track and that its ground speed is about 120 miles an hour (Fig. 6a). The landing platform is accelerated at 5 feet per second per second, so that it acquires a speed of 100 miles an hour in about 30 seconds at a point about 2,250 feet from the end of the track and then continues along the track at a uniform speed of 100 miles an hour. While the landing platform is accelerating, the airplane is so directed that its movement over the ground is directly toward the platform. The airplane gradually loses altitude and reduces its speed while the platform is accelerating (Figs. 5b, 6b) so that it overtakes the platform at about the time that the platform has attained a speed of 100 miles an hour (Figs. 5c, 6c). By this time, the elevation of the airplane has been reduced to about 25 feet (Fig. 5c). The airplane then flies directly above the platform at this elevation while the pilot adjusts his direction and air speed so that the ground speed and direction of the plane are the same as the speed of the platform and the direction of the track. The pilot then sets the plane down on the platform (Figs. 5c, 6c, dotted position). During both these maneuvers, the air speed of the airplane is above its minimum flying speed, so that it is under perfect control. As soon as the skids of the airplane touch the platform, the magnetic grids of the platform are energized to hold the airplane on the platform. The airplane engines are then idled and the platform is slowed down and brought to a standstill as rapidly as possible without undue shock.

It will be noted that there is no relative movement in a horizontal plane between the airplane and the platform either immediately before or at the moment at which the airplane is brought in contact with the platform, and that this condition is achieved in the case of a cross-wind, as illustrated, by pointing the airplane at an angle to the direction of the track before and at the moment of contact. It will be understood that in case of a calm or of a wind directly along the track, the airplane will be pointed in line with the track, and that, in the case of winds at an angle of less than 90° to the track or of less velocity than the wind indicated in the drawings, the axis of the airplane will be more nearly parallel to the track than shown in the drawings. It will be understood also that, in the case of winds along the track, the platform is preferably started at the down-wind end of the track when the airplane is brought over the marker at that end of the track, so that the movement of the airplane over the ground in landing is never greater than the speed of the platform.

While it is desirable that the track should be straight and level for the entire distance through which the platform moves during the landing operation, this is not essential as the accelerating and decelerating movements of the platform may be on curved tracks such as the track T' illustrated in dotted lines in Fig. 6c.

A further feature of the invention consists in utilizing the magnetic field of the electromagnet in the landing platform to guide an airplane to the platform in making blind landings. In accordance with this feature of the invention, the electromagnetic grid of the platform is energized as soon as the platform is started in motion. The airplane is provided with instruments such as the well-known dip needle and the earth inductor compass which serve to indicate to the aviator the direction and distance of the magnet on the platform from the plane so that he is able to guide the plane to the platform without seeing the platform.

The equipment which has been described may, when desired, be used for the take-off of airplanes.

The advantages of the method and apparatus which have been described include the following: The high minimum flying speeds which are permitted make it possible to obtain, without additional power, maximum flying speeds very much higher than those reached at present. The substitution of a railroad track of less than two miles in length for a landing field of large area makes it possible to provide for landing the fastest and largest planes near large cities. As there is no relative horizontal movement between the airplane and the platform when they contact, crosswind landings may be made safely without danger of ground-looping. The fact that the landing equipment can be moved about rapidly on ordinary railroad tracks and used wherever a straight piece of track exists in any existing railroad is an important military advantage, as it makes the landing equipment practically immune from enemy bombing.

What I claim is:

1. The method of landing an airplane, which comprises moving a landing platform rapidly along a straight line at a substantial angle to the direction of the wind, bringing the airplane directly over the platform and so regulating the direction and speed of its movement through the air that its movement over the ground has the same direction and speed as that of the platform, and then bringing the airplane into contact with the platform while there is no relative horizontal movement between the airplane and the platform and the longitudinal axis of the airplane is at a substantial angle to the line of movement of the platform.

2. The method of landing an airplane, which comprises moving a landing platform rapidly along a straight track at a substantial angle to the direction of the wind, bringing the airplane in line with the track and pointing it at such an angle to the wind that its movement over the ground is in line with the track, bringing the airplane directly over the platform and so regulating the direction and speed of its movement through the air that its movement over the ground has the same direction and speed as that of the platform, and then bringing the airplane into contact with the platform while there is no relative horizontal movement between them and the longitudinal axis of the airplane is at a substantial angle to the line of movement of the platform.

3. A method of landing an airplane on a mobile landing platform mounted for movement along a fixed straight line, which comprises starting and accelerating the landing platform along said line when the airplane passes over a fixed point at a predetermined distance behind the platform, pointing the airplane in such direction with respect to the wind that its motion over the ground is along the line of movement of the platform at a speed somewhat greater than the maximum speed of the platform, gradually reducing the speed and elevation of the airplane while the speed of the platform is increased to its maximum speed so that the airplane overtakes the platform, making the speed and direction of movement of the airplane over the ground equal to the speed and direction and movement of the platform when the airplane arrives over the platform so that there is no relative horizontal movement between them, lowering the airplane upon the platform, securing it to the platform, in the position in which it comes in contact with the platform and decelerating the platform carrying the airplane to a standstill.

4. A mobile landing platform for airplanes, comprising two automotive railway cars, detachable means for securing said cars together side-by-side on a double track, and detachable fairing means providing a flat landing surface extending across both of the cars, so that by detachment of said fairing means and said securing means the cars may be separated and run in tandem on a single track.

5. A mobile landing platform for airplanes, comprising two railway cars, electric motors on each of said cars, detachable means for securing said cars together side-by-side on a double track, a detachable electric conductor connecting the motors of the two cars, and detachable fairing means providing a flat landing surface extending across both the cars, so that by detachment of said fairing means and by detachment of said securing means and said electric conductor the cars may be separated and run in tandem on a single track.

6. A mobile landing platform for airplanes, comprising two railway cars, an electro-magnetic grid at the top of each car, an electric generator and an internal combustion motor for driving the same on each car, electric motors on each car, electric connections between the generator and the motors and between the generator and the electro-magnetic grid on each car, detachable means for securing said cars together side-by-side on a double track, detachable fairing means providing a flat landing surface extending across both of the cars on a level with their magnetic grids, and detachable electric conductors connecting the electric circuits of the two cars, so that the cars may be operated as a unit on a double track or separated and run in tandem on a single track.

7. The method of landing an airplane, which comprises moving a landing platform containing a magnet, bringing an airplane within the magnetic field of this magnet, utilizing the magnetic field to determine the distance and direction of the platform from the airplane and for guiding the airplane to and landing it on the platform.

DAVID H. BOTTRILL.